A. ALEXAY.
GEAR GENERATING MACHINE.
APPLICATION FILED JAN. 28, 1920.
1,408,792.
Patented Mar. 7, 1922.
3 SHEETS—SHEET 1.
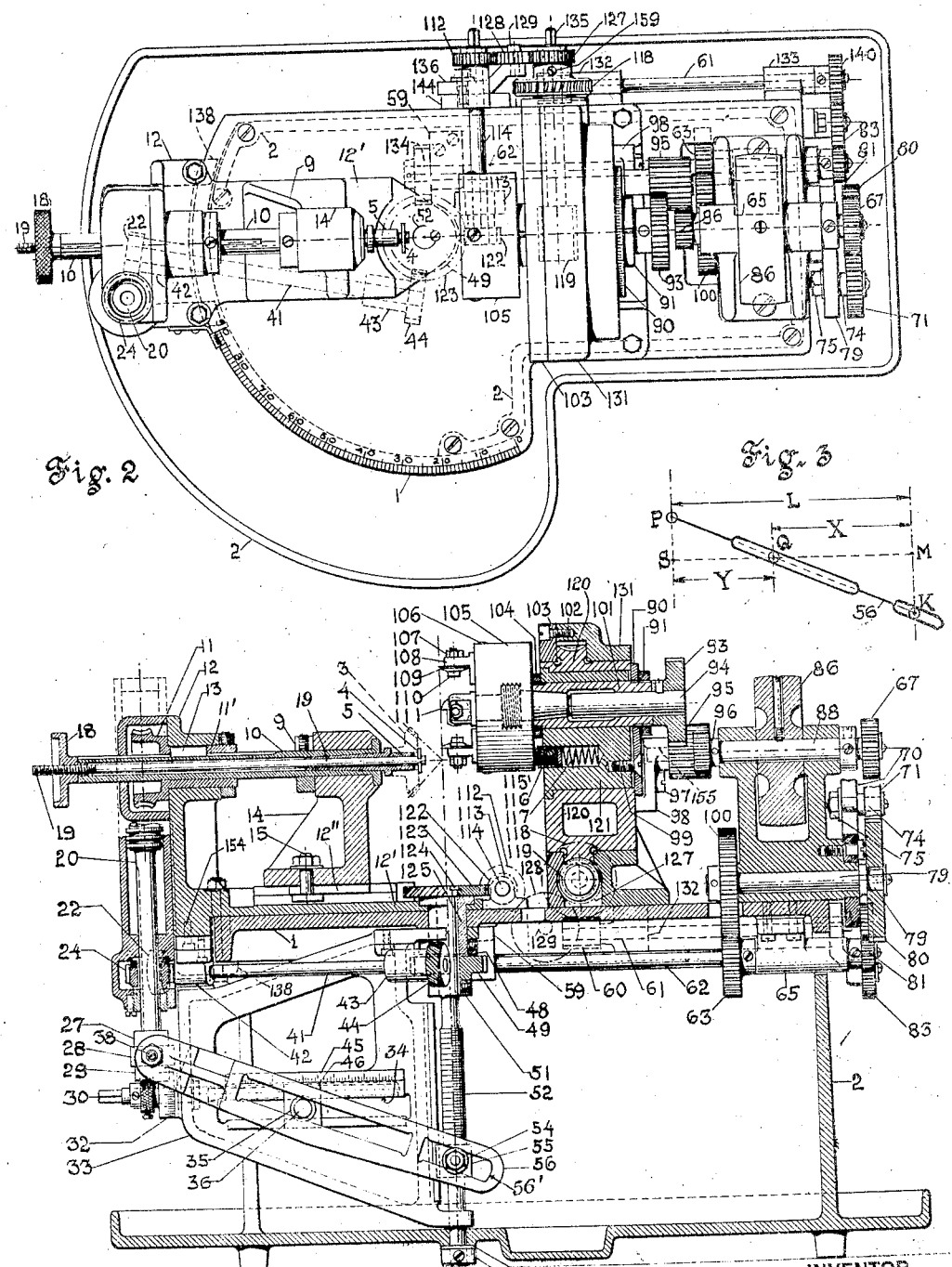

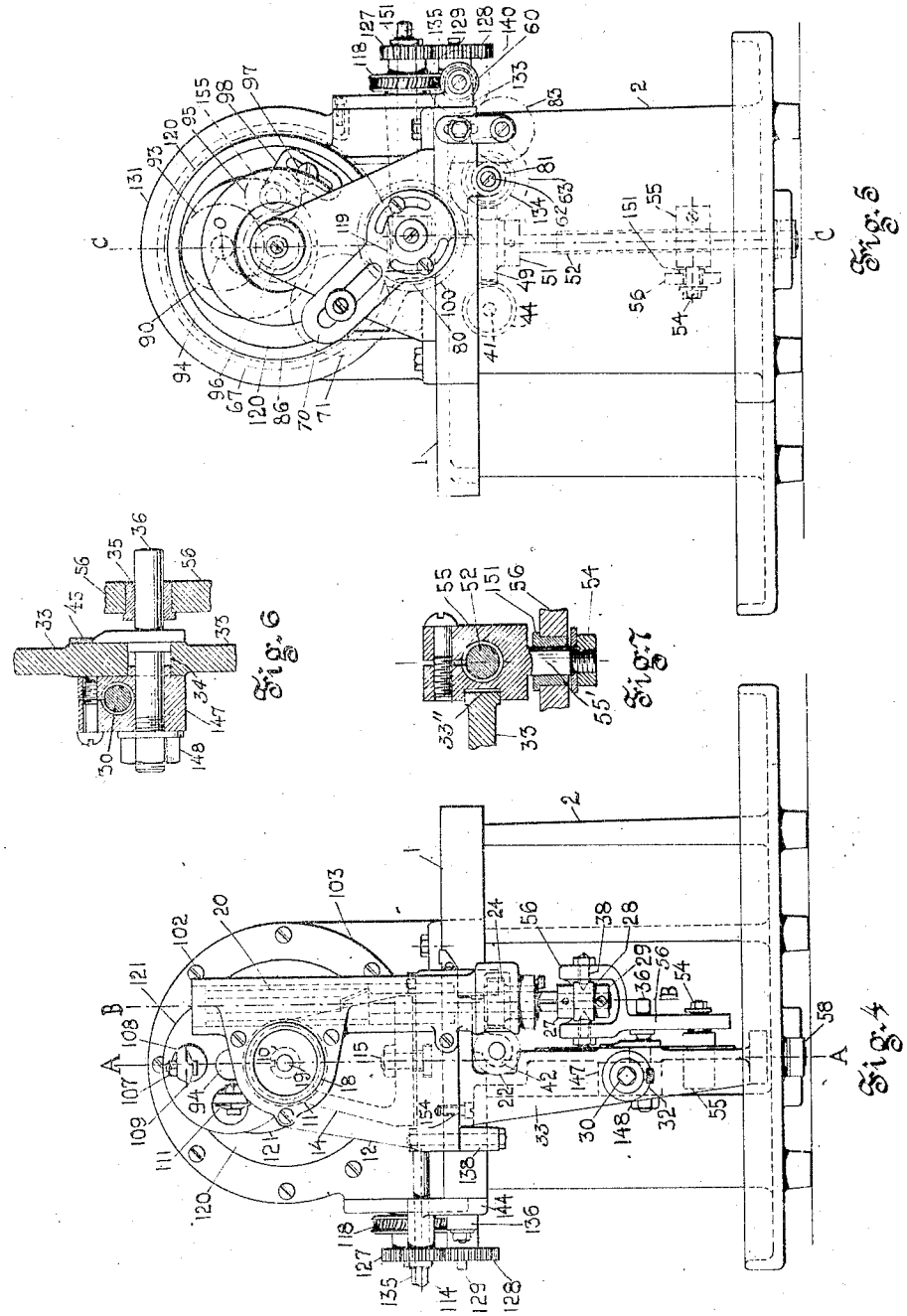

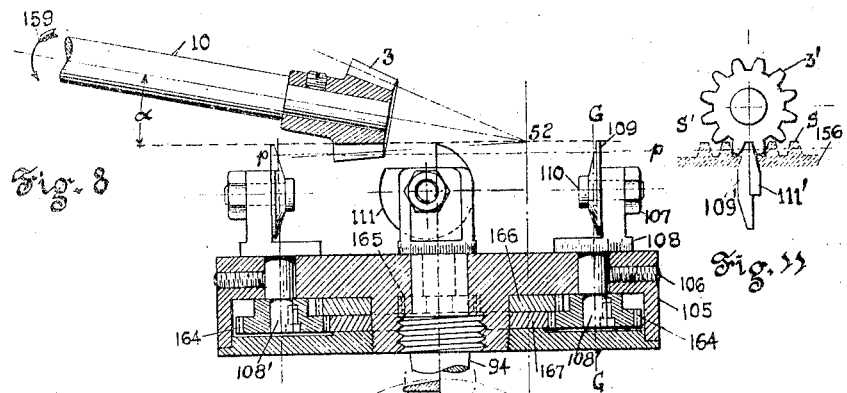

UNITED STATES PATENT OFFICE.

ADALBERT ALEXAY, OF AVENEL, NEW JERSEY.

GEAR-GENERATING MACHINE.

1,408,792.

Specification of Letters Patent. Patented Mar. 7, 1922.

Application filed January 28, 1920. Serial No. 354,544.

*To all whom it may concern:*

Be it known that I, ADALBERT ALEXAY, a subject citizen of Hungary, and a resident of Avenel, county of Middlesex, and State of New Jersey, have invented certain new and useful Improvements in Gear-Generating Machines, of which the following is a full, clear, and exact description.

This invention relates to gear cutting machines and especially to a type of machine suitable for the production of curved tooth beveled gears.

Spur gears have heretofore been produced by a hobbing process, and the present invention is an application of the hobbing principle to the production of curved tooth beveled gears, so that a gear of this type may be produced complete in a single cycle of operations and with precision in any size and conical pitch.

The present invention aims to provide a machine of the type mentioned which is simple in construction, reliable in and easy of operation, and inexpensive to build. Further to provide a machine that will cut curved teeth of involute form on bevel gears and with provision for adjustment to cut oppositely curved teeth without the necessity of re-setting the cutting-tools heretofore a source of inaccuracy in making a pair of mating or intermeshing bevel gears. Still further it aims to provide in such a machine adjustments permitting gears to be cut with any suitable number of teeth and at any desired conical pitch. Also it contemplates adjustments easily regulated to suit the feed of the cutters into the blank. And further it aims to provide simple and reliable mechanism for obtaining and maintaining profile generation and of an adjustable type accommodating the machine to the manufacture of any sized gear and without the necessity of substituting change gears.

The invention consists essentially in rotating a gear blank in the path of a plurality of rotating cutters at such an angular velocity that the blank will be indexed with the cutters and simultaneously rolling the blank and the cutters in the manner of intermeshing crown and bevel gears, the last named movement insuring profile generation, i. e., radial shaping of the sides of teeth. In a preferred embodiment of the invention the gear blank is supported on a revolvable spindle in an adjustable head, which may be positioned in various angular relations to a rotating and rolling cutter. The cutter comprises a head carrying a plurality of blades which are revolved about a common axis and while revolving their common axis is rolled by being moved in a circular path. The work spindle and the cutter spindle are revolved at definite angular velocities, that of the spindle being the angular velocity necessary to insure indexing plus or minus (as the case may be) the angular velocity necessary to roll the blank in proper proportion to the roll of the cutters. The various motions are derived from a single main shaft through suitable trains of gearing some of which are changeable to enable different sized gears to be made, and between the means for moving the cutter spindle bodily in a circular path and the means for rotating the work spindle is a proportionating device which may be termed a differential lever.

These are the objects of my invention, but other objects will appear in the following detailed description of the embodiment thereof shown in the accompanying drawings, in which—

Fig. 1 is a sectional side elevation;

Fig. 2 is the top plan view;

Fig. 3 is a diagrammatic illustration of a lever forming part of the differential mechanism governing the relative profile generating movement of the blank and cutter;

Figs. 4 and 5 are end elevations from the left and right respectively of Fig. 2;

Fig. 6 is a detail in vertical section of the pivotal support for the lever diagrammed in Fig. 3;

Fig. 7 is a detail in horizontal section of an articulated connection between the differential lever and a driving screw therefor.

Fig. 8 illustrates in section the gear blank and cutter head in operative relation and shows in detail an improved form of gearing within the cutter head for setting a plurality of similar cutting blades in one operation;

Fig. 9 represents more or less diagrammatically the relation of the cutting blades and blank viewed axially of and from the rear of the cutter head with an imaginary crown gear appearing in dotted lines;

Fig. 10 represents diagrammatically a cutter functioning in the same manner as an imaginary crown gear on an opposed gear blank shown flat for the sake of clearness.

Fig. 11 illustrates how a pair of the cutters travel in paths coincident with the faces of a tooth of an imaginary crown gear.

In the embodiment of the invention illustrated and referring to Fig. 1 for the present, the blank 3 is supported on an arbor 5 and clamped thereto by a removable horseshoe washer 4 on the end of a rod 19 whose opposite end is threaded to receive the hand wheel 18 for clamping the blank firmly to the arbor. The tapered end of the arbor 5 is socketed in a flanged tubular spindle 10 which is journaled in standards 12 and 14. A collar 9 confines the flanged tubular spindle 10 against endwise movement. The standard 12 rests upon the top 1 of a frame 2 and its base has a plate like extension 12' by which the standard is hinged for movement about a vertical axis of the machine as will be hereinafter described. The plate-like portion 12' is provided with a T-slot 12" for a T-bolt 15 adjustably securing the two standards together, and permitting the apex of the pitch or root-cone of any bevel gear blank to be located in intersecting relation with the perpendicular axis of the machine which lies in the plane of rotation of the cutting points of the tools as shown in Fig. 8. The standards 12 and 14 together constitute a swivel head which is adjustably clamped to the top 1 of the frame in any necessary position by clamps indicated at 138, Fig. 1.

The tubular work spindle 10 is rotated by a worm gear 11 which is feathered thereto by the key 13, a bushing 11' integral with or otherwise fixed to the worm gear 11 being confined by the collar 7 against the adjacent portions of the standard 12. The worm wheel 11 is rotated by a worm on the vertical shaft 20 which is driven by a spiral gear 24 slidably keyed thereto, the latter gear being in turn driven by a spiral gear 22 fixed to a shaft 41 which is supported by brackets 42—43 that are fixed relative to and therefore movable with the shiftable head 12—14. On the opposite end of the shaft 41 is a spiral gear 44 which is driven by a gear 49 supported by a collar 51 but itself loose on a perpendicular spindle 52 whose axis constitutes the before-mentioned perpendicular axis of the machine in which the apex of the blank's root-cone is located.

The spiral gear 49 (see now Fig. 2) is driven by gear 134, on one end of a shaft 62 which is supported by brackets 59—65 suitably fixed to the frame and which is driven through spur gears 63 and 100. The spur gear 100 is fast on the end of a counter-shaft 79 on the opposite end of which is a gear 80 connected by change gear 71 to a gear 67 which is fast on the main shaft 88 adapted to be driven through the thereto fast belt pulley 86. The gear 71 is supported on a stud 74 which is clamped by the nut 75 in any desired position in a slot in the bracket arm 70. Through the above described connections the gear blank 3 is driven from the main shaft of the machine at a definite angular velocity which may be varied by changing the gears 80, 71, 67 to get the required angular velocity.

An even plurality of cutters 109, 111, of the circular type illustrated best in Figs. 8 and 1, are secured to a cutter head 105 equal distances apart and with the pitch line point on their inclined cutting edges in axial alignment with their central supporting studs which are socketed in the cutting head 105 and fixed in place by set screws 106. The cutter head 105 is threaded or otherwise suitably secured to the end of a cutting spindle 94 which is journaled in a bushing 101 and rotated through a gear 93 fast on its opposite end and an idler 95, by a pinion 96 on the main shaft 88. The idler 95 is supported on a stud 155 (see Fig. 5) projecting laterally from a bracket 98 which is adjustably secured by a screw and slot connection 97 to a worm wheel 120. The bushing 101 sustaining the cutting spindle 94 is journaled eccentrically in a quill 121, which in turn is journaled eccentrically in the worm wheel 120. The worm wheel 120 is rotatably housed in a stationary casing 131 and confined against lateral or axial displacement by a flange 103 screwed as indicated at 102 to the casing.

The quill 121 is flanged at its end adjacent the cutters as illustrated and is adjustably secured in position in the worm wheel 120 by a plate 90 and screw 99, the plate 90 being provided marginally with a scale and resting against the worm 120 and permitting the screw 99 to draw the flanged quill 121 tightly against the body of the worm. The bushing 101 which rotatably supports the cutter spindle 94 in the quill is held against axial displacement by lock nuts 91 and 104 which incidently augment the binding of the quill 121 to the worm 120.

Through the above-described connections it will be seen that the cutting blades on the cutting head may be rotated at a suitable angular velocity by the planetary gearing 93, 95, 96, which latter is changeable. It will also be noticed that the quill 121 permits varying the eccentric disposition of the cutter spindle 94 and this, as will presently appear, more clearly permits of varying the rolling or profile generating movement of the cutters, which in traversing the blank describe paths collectively conforming to an imaginary crown gear tooth in moving from initial to full intermeshing relation with its conjugate bevel gear.

It will be understood that the means above-described will permit of rotating the gear blank at such an angular velocity relative to the rotating cutters as to insure the entrance of the cutters successively into the tooth spaces, thereby indexing the blank relative to the cutter. In order to cut the teeth to the proper shape in profile it is necessary to modify the angular velocities of the blank and the cutter by compounding with their indexing movement a rolling movement which is generally known in the art as a profile generating movement.

In the machine illustrated this is accomplished by driving the worm wheel or body 120 through a worm 119 on one end of a shaft 135 whose opposite end carries a worm wheel 118 driven in turn by a worm 60 on one end of a shaft 61, supported by brackets 132—133, whose opposite end is operatively connected by a set of change gears 140—83—81, to the before-mentioned shaft 62. The worm wheel 118 on the rear end of shaft 135 is secured by the set screw 159, which may be loosened to permit manual rotation thereof in either direction to initially set the machine. Through the connections just mentioned the worm wheel 120 may be revolved at any suitable speed, which will of course be very low as it feeds the cutters into the work, to cause the cutter axis 94 to travel in the arc of a circle about the axis of the worm wheel 120, which is coincident with the axis of the main shaft 88. The axis of shaft 88 intersects at right angles the axis of the vertical spindle 52 before-mentioned.

The profile generating movement of the blank is derived from the slowly turning worm wheel 120 as seen from Fig. 2. The connections for accomplishing this include pinion 127 fixed to the shaft 135 in the rear of the worm wheel 118 and an idler 128 pivotally supported on stud 129 projecting from the bracket 136, which in turn is adjustably secured to the bracket 144 fixed to the frame of the machine. With the idler 128 meshes the spur gear 112 on the rear end of shaft 114 which is journaled in brackets 113 and 144 suitably fixed to the frame of the machine. On the forward end of shaft 114 is a spiral gear 122 which drives the skew gear 123, Fig. 1, fast on the spindle 52 whose upper end is journaled in a flanged bushing 125 confined by the collar 48 and an intervening collar portion 33' of a bracket-frame 33 to the top of the machine frame 2, the lower end of the spindle 52 being journaled in the base of the machine frame 2 and held against axial displacement by the fixed collar 58 and wear washer 57. On this bushing 125 the swivel-head 12—14 previously mentioned swings or pivots as does also the bracket-frame 33 which is fixed to the standard 12 by bolt 154, Fig. 1. The spindle 52 is threaded intermediately for a portion of its length as indicated in Fig. 1 and its threads are embraced by a split nut 55, which is notched as indicated in Fig. 7 to receive a vertical guide edge 33'' of the bracket-frame 33. This edge 33'' restrains the split nut against rotation and allows it to move only axially of the spindle 52. Projecting laterally from the nut 55 is a shouldered stud 55' which has a nut 54 threaded on its free end and is embraced by a bushing 151 having parallel flat faces slidable in a slot 56' provided in a lever 56. The lever 56 is fulcrumed intermediate its ends on a pin 36, and the yoke shaped opposite extremity of the lever is provided with trunnion pins 38 entering a collar 28 loose on the worm shaft 20, but confined against axial displacement thereof by collars 27 and 29 which are secured to the shaft 20.

The fulcrum 36 for the lever 56 is of the special construction shown best in detail in Fig. 6, the pin 36 being embraced by a bushing 35 having flat diametrically opposed faces engaged by the opposed walls of an elongated slot in the lever 56. The pin 36 is adjustable in a slot 34 provided in the frame 33 and may be clamped in position therein by the nut 148 on its opposite free end, which bears against the split nut 147 having a projecting portion entering the slot 33'. Fast on the fulcrum pin 36 is a plate 46 having a nut-like projection also entering the recess 33' of the frame 33. The plate 46 is scored for convenience in locating the pin 36 in the slot 34 which is paralleled by a scale 45. Between the last-mentioned device and the nut 148 the fulcrum pin 36 may be securely held after location in any desired position. To locate the fulcrum pin 36 to the exact position required the split nut 147 is adapted to receive an adjusting screw 30, which is provided with a scale 32, thus functioning as a micrometer and permitting great accuracy in setting.

In Fig. 3 the lever 56 is illustrated diagrammatically. Q represents the adjustable fulcrum for the lever and P and K the fixed and sliding connections respectively with the axially shiftable worm shaft 20 and the non-axially-movable but threaded drive spindle 52, the axes of which are parallel. As the triangles P, Q, S and Q, M, K are always similar no matter what positions the lever occupies, their sides are always in proportion, therefore, X is to Y as K, M, is to P, S. By adjusting the fulcrum pin 36 to the proper position on the scale it will therefore be seen that gear blanks of various sizes may be rolled exactly in constant proportion to the cutters and consequently that an exact profile generation may be obtained.

It will thus be seen that the worm shaft 20 simultaneously transmits two motions to the blank being cut, an indexing movement by rotation about its own axis and a profile generating movement by endwise or axial displacement, the two motions being compounded. The worm shaft 20 therefore, functions as a combined worm and rack driver of the worm gear 11 which directly drives the spindle 10 constituting the blank carrier.

Referring to Fig. 8 it will be noticed that the cutting blades 109—111 are of a flat right-conical form being centrally and adjustably clamped by bolt 110 and nut 107 to a holder 108 having a stud 108' secured in any desired position by set screw 106. The cutting edges of the blades are formed to one side of their center, i. e. the cutting edges are not located radially of their axial support. These cutting edges are also inclined to the axis of the cutter spindle when viewed in end elevation as shown at the right of Fig. 8. It is to be noticed however, that the cutting edges on blades 109—111 are inclined oppositely to each other and with respect to the axis of the cutter spindle 94, and this opposite inclination is necessary in order to cut the convex and concave sides of contiguous teeth. The requisite clearance in rear of the cutting edges is afforded by the conical surfaces of the blades and by the location of the body of alternate blades on opposite sides of the circular path $p$ traversed by the pitch point on the cutting edges of each tool, the pitch point being indicated in Fig. 8 at the intersection of axial line G—G with line $pp$.

In Fig. 8 the studs 108' of the several holders for the blades are shown each provided with gears 164—165, the former connected to blades 109 and meshing with a gear 167 loosely supported within the cutter head 105 and the latter connected to blades 111 and meshing with a similar gear 166. Through these gears adjustment of one cutter about the axis of its supporting stud 108' will set all similar gears. And thus by adjusting one of each set of right and left cutters, all cutters may be properly positioned in, roughly speaking, tangential relation to their circular path of movement.

If desired a packing or other fibrous material 115, see Fig. 1, in a cup 116 under the action of a compression spring 117 housed in a socket in the eccentric 121 may be provided to reduce, if not eliminate, chattering of the cutters as they successively engage the blank.

In operation, the gear blank 3 is positioned on the arbor 5 and clamped to the work spindle by drawing up on horseshoe washer 4 through rod 19 and hand wheel 18. Eccentric 121 is adjusted relative to the axis of the quill or worm 120 to so locate the cutters that they will duplicate the rolling motion of the teeth on an imaginary crown gear. The sets of gears 140—83—81, 80—71—67, and 93—95—96 are properly adjusted to give the necessary angular velocities to the cutter and work spindles to insure indexing. A desirable roll is also allowed for the cutter spindle 94, this roll being the profile generating movement of the cutters and incidently it constitutes the feed for carrying the cutters gradually into the work. From the roll of the cutters the roll of the blank is derived through the differential lever 56 which is adjusted to proportion the blank's profile generating movement to that of the cutter's, whatever the latter may be.

When the machine has been properly adjusted in the manner above-described with the shiftable head 12—14 secured in position with the root-cone of the blank substantially tangent to the plane in which the ends of the cutters rotate, the machine is started to operating and continues uninterruptedly until the gear is formed with all of its teeth complete, it being understood that the continuously rotating cutters are gradually fed further and further into the blank by their profile generating movement in the same manner as a single tooth on one of two intermeshing beveled gears moves from initial to full engaging relation with its mating gear.

In Fig. 9 the relative directions of motion of a blank, cutting blades, and cutter spindle are shown by arrows 160, 157 and 158 respectively. The gears 164 and their common adjusting gear 167, and likewise the gears 165 and their common adjusting gear 166 are illustrated in this figure in dotted lines.

The machine above described in detail operates upon the principle of conjugate crown and bevel gears, the cutting edges of the blades describing paths when they cross the gear blank, that correspond to the teeth on a crown gear, and these paths are inclined by reason of the rolling or profile generating movement imparted to the blank and cutter spindles in exactly the same manner as a single tooth on the crown gear is inclined in moving from initial to full intermeshing relation with a conjugate bevel gear. The crown gear is illustrated in Fig. 9 by faint dash lines, its outermost edge being indicated by the numeral 156 and two of its teeth being illustrated in cross-section at S and S'. The cutter spindle 94 in Fig. 9 is shown to be coincident with the median circle of the imaginary crown gear and the arrow 158 indicates the direction of roll. By consideration of this figure the theory of the cutting action will be apparent.

While only four cutters are shown in the preferred form of the invention, it will be obvious that any even plurality of cutters may be employed. In Fig. 10 such a greater even plurality of cutters is illustrated in operative relation with a gear blank, which is for convenience shown in opposed parallel relation to the cutters. The arrows 162 and 163 indicate the directions in which the cutters and blank rotate and the axis about which the cutters rotate is indicated at O. In Fig. 10 the cutter F is shown just engaging the convex side of a tooth and the cutter G leaving a tooth space after having cut the concave face of the same tooth. In this figure of the drawings the gear blank is shown formed with teeth of one curvature. It will be noticed that the cutters pass from the outside to the inside of the blank and that they cross the blank towards the upper portion of their circular path. For cutting oppositely curved teeth on a beveled gear to mesh with that illustrated in solid lines in Fig. 10, cutter spindle 94 is shifted about 90°, so that the cutters may traverse the gear blank in the lower portion of their circular path of movement. In Fig. 10 this is illustrated graphically, the axis of the cutter spindle being indicated at $O_4$, the circular path of the cutters being indicated by the arrow 168, and one side of the oppositely curved tooth on a beveled gear that will mesh with the one shown in full lines being indicated by the heavy dotted line $q_4$. To permit the cutter spindle 94 to be shifted quickly from one position to the other, the set screw 159 is loosened and the shaft 135 turned by its protruding square end in any convenient manner.

While the foregoing description delineates the preferred form of construction, it will be understood that the invention is not limited thereto specifically. Various changes may be made in details of construction without departing from the underlying principles and reference should be made to the following claims for an understanding of the scope and limits of the invention.

It is to be noted that the angular velocity of the cutting blades is modified by their planetary gear drive during the rolling motion imparted to the work. This modification may be a positive or negative one. This modification of the indexing motion of the cutting blades necessitates similar modification or alteration of the indexing movement of the blank. In order to maintain the proper and necessary indexing relation, the fulcrum 36 of the differential lever 56 is set a proportionate amount to one side or the other of the position it would occupy were it not for the modifying action of the planetary gear drive. Thus the proper indexing and profile generating movement of the cutter and blank is maintained, and the lever 56 called upon to perform still another function.

Having thus described my invention, what I claim as new and desire to protect by Letters Patent is:

1. In a curved tooth gear cutting machine, a revolvable work spindle, a revolvable cutter spindle, carrying two or more cutting blades, means for rotating said spindles at definite angular velocities indexing the blank with the cutter whereby all the teeth may be cut in a cycle of operations, and means including a single member for simultaneously rolling said blank and cutter in the manner of intermeshing gears to effect profile generation of their teeth.

2. In a curved tooth gear cutting machine, a work spindle, a cutter spindle carrying one or more cutting blades, and means for rotating in definite indexing relation and simultaneously producing a profile generating movement of the blank and cutters after the fashion of intermeshing gears, said last named means including a proportionating mechanism modifying the action of means for continuously indexing the blanks and cutters to simultaneously govern the cutting of the teeth in profile.

3. In a beveled gear cutting machine, in combination, a blank carrier, a cutter, means for rotating the carrier and cutter at angular velocities indexing the blank and cutter so as to cut a plurality of teeth with every revolution of the cutter, and means for imparting a profile generating movement to the cutter and carrier, said last named means including a transmitting mechanism whose opposite effective ends are movable only in proportion to each other.

4. In a machine for cutting curved tooth beveled gears, in combination, a blank carrier, a cutter, means for rotating the carrier and cutter simultaneously in definite indexing relation, and profile mechanism for rolling the carrier and cutter in definite generating relation including devices movable in one given direction only during the complete cutting of a gear.

5. In a machine for cutting curved tooth beveled gears, in combination, a blank carrier, a cutter, means for rotating the carrier and cutter simultaneously in definite indexing relation, and profile mechanism for rolling the carrier and cutter in definite generating relation including a differential lever proportioning the rolling movement of the blank and cutter.

6. In a machine for cutting curved tooth beveled gears, in combination, a blank carrier, a cutter, means for rotating the carrier and cutter simultaneously in definite indexing relation, and profile mechanism for rolling the carrier and cutter in definite generating relation including a combined rack and worm for rolling the gear blank in proportion to the cutter.

7. In a machine for cutting curved tooth beveled gears, in combination, a blank carrier, a cutter, means for rotating the carrier and cutter simultaneously in definite indexing relation, and profile mechanism for rolling the carrier and cutter in definite generating relation including a lever pivoted intermediate its ends for proportioning the rolling movement of the blank and carrier.

8. In a machine for cutting curved tooth beveled gears, in combination, a blank carrier, a cutter, means for rotating the carrier and cutter simultaneously in definite indexing relation, and profile mechanism for rolling the carrier and cutter in definite generating relation including an adjustable differential lever proportioning the rolling movement of the cutter and gear blank.

9. In a machine for cutting curved tooth beveled gears, in combination, a blank carrier, a cutter, means for rotating the carrier and cutter simultaneously in definite indexing relation, profile mechanism for rolling the carrier and cutter in definite generating relation including a lever pivoted intermediate its ends for proportioning the rolling movement of the blank and carrier, and means permitting adjustment of said lever's pivot to vary the relative rolling movement of the cutter and blank.

10. In a machine for cutting curved tooth beveled gears, in combination, a blank carrier, a cutter, means for rotating the carrier and cutter simultaneously in definite indexing relation, and profile mechanism for rolling the carrier and cutter in definite generating relation including worm-shaped devices operating the blank carrier and the cutter.

11. In a machine for cutting curved tooth beveled gears, in combination, a blank carrier, a cutter, means for rotating the carrier and cutter simultaneously in definite indexing relation, and profile mechanism for rolling the carrier and cutter in definite generating relation including a member having combined rotative and endwise movement with respect to its own axis.

12. In a machine for cutting curved tooth beveled gears, in combination, a blank carrier, a cutter, means for rotating the carrier and cutter simultaneously in definite indexing relation, and means for rolling the carrier and cutter in definite generating relation about independent axes one of which is noncoincident with its axis of indexing rotation, the means for rotating the cutter in indexing relation with the blank including a worm-wheel, a cutter-spindle disposed eccentrically of said worm-wheel, and means permitting shift of the cutter-spindle to vary its eccentricity.

13. In a machine for cutting curved tooth beveled gears, in combination, a blank carrier, a cutter, means for rotating the carrier and cutter simultaneously in definite indexing relation, and means for rolling the carrier and cutter in definite generating relation about independent axes one of which is noncoincident with its axis of indexing rotation, the means for rotating the cutter in indexing relation with the blank including a worm-wheel revolvable about a fixed axis, a cutter spindle disposed eccentrically thereof, a main shaft, and planetary gearing operatively connecting said main shaft and cutter spindle.

14. In a machine for continuously cutting gear blanks, in combination, a cutter head carrying a plurality of cutters, a spindle supporting said cutter head, means for rotating said spindle, and means frictionally retarding the rotation of the cutter head and thereby taking up lost motion in the means for rotating the spindle.

15. In a machine for continuously cutting curved tooth bevel gears, in combination, a main shaft, a blank carrier, means for rotating the blank carrier from the main shaft, a cutter, and means for rotating the cutter from the main shaft and simultaneously moving the axis of the cutter bodily sidewise, said last named means including drive shafts disposed in parallel and right-angular relation only, and means for transmitting the bodily sidewise movement of the cutter axis to the blank carrier in a predetermined ratio.

16. In a machine for continuously cutting curved tooth beveled gears complete in one operation, in combination, a blank carrier, a cutter, means for simultaneously indexing said carrier and cutter, adjustable means for supporting said blank carrier permitting variation of its angular relation to the cutter, and means fixed to and movable with said supporting means for proportioning the profile generating movement of the blank carrier to that of the cutter.

17. In a machine for continuously cutting curved tooth beveled gears in one cycle of operations, in combination, a frame, a perpendicular drive shaft, a head swiveled upon said shaft, a main shaft whose axis is in intersecting right-angular relation with said perpendicular shaft, a blank carrier, a cutter, means for rotating the carrier and cutter in definite indexing relation, means for rolling the cutters, and means operatively connected with the last named rolling means and including said perpendicular drive shaft for proportioning the roll of the blank carrier to that of the cutter.

18. In a machine for cutting curved tooth beveled gears, in combination, a blank carrier, a cutter, means for rotating the carrier and cutter simultaneously in definite indexing relation, and means for rolling the carrier and cutter in definite generating relation about independent axes one of which is noncoincident with its axis of indexing rotation, the means for rotating the cutter in indexing relation with the blank including a worm-wheel revolvable about a fixed axis, a cutter spindle disposed eccentrically thereof, a main shaft, and means operatively connecting said main shaft and cutter spindle.

Signed at Avenel, county of Middlesex, and State of New Jersey, this 26 day of January, 1920.

ADALBERT ALEXAY.